(12) United States Patent
Steffens et al.

(10) Patent No.: US 12,140,211 B2
(45) Date of Patent: Nov. 12, 2024

(54) GROUP TRANSMISSION DEVICE, IN PARTICULAR SPLIT TRANSMISSION

(71) Applicant: Daimler Truck AG, Leinfelden-Echterdingen (DE)

(72) Inventors: Frank Steffens, Ostfildern (DE); Marc Stroelin, Neuhausen (DE); Jens Luckmann, Winnenden (DE); Marc Klein, Denkendorf (DE); Detlef Schnitzer, Denkendorf (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/768,740

(22) PCT Filed: Oct. 7, 2020

(86) PCT No.: PCT/EP2020/078094
§ 371 (c)(1),
(2) Date: Apr. 13, 2022

(87) PCT Pub. No.: WO2021/073970
PCT Pub. Date: Apr. 22, 2021

(65) Prior Publication Data
US 2024/0141971 A1    May 2, 2024

(30) Foreign Application Priority Data
Oct. 14, 2019   (DE) .................... 10 2019 007 133.6

(51) Int. Cl.
*F16H 37/04* (2006.01)
(52) U.S. Cl.
CPC ..... *F16H 37/046* (2013.01); *F16H 2037/049* (2013.01); *F16H 2200/0078* (2013.01);
(Continued)

(58) Field of Classification Search
CPC .. F16H 37/046; F16H 37/082; F16H 37/0826; F16H 2037/049; F16H 2037/047;
(Continued)

(56) References Cited

U.S. PATENT DOCUMENTS

| 8,936,529 B2 * | 1/2015 | Kaltenbach ........... F16H 37/046 74/331 |
| 10,940,749 B2 * | 3/2021 | Preuß .................... B60W 10/08 |
| 11,009,102 B2 | 5/2021 | Steffens et al. |

FOREIGN PATENT DOCUMENTS

| DE | 10 2011 088 396 A1 | 6/2013 |
| DE | 10 2013 202 045 A1 | 8/2014 |

(Continued)

OTHER PUBLICATIONS

PCT/EP2020/078094, International Search Report dated Dec. 1, 2020 (Two (2) pages).

*Primary Examiner* — Huan Le
(74) *Attorney, Agent, or Firm* — Crowell & Moring LLP

(57) ABSTRACT

A group transmission device includes an upshift assembly with a first transmission element, a second transmission element and a third transmission element. A downshift assembly has a first transmission element, a second transmission element and a third transmission element. A main shaft is arranged coaxially to the upshift assembly and a layshaft is arranged parallel to the main shaft. A first idler gear is arranged coaxially to the main shaft and axially between the upshift assembly and the downshift assembly and is connectable to the main shaft for conjoint rotation by a first shift unit. The first idler gear is connectable to the third transmission element of the downshift assembly for conjoint rotation by a second shift unit.

12 Claims, 3 Drawing Sheets

(52) U.S. Cl.
 CPC ............... *F16H 2200/0095* (2013.01); *F16H 2200/2007* (2013.01)

(58) Field of Classification Search
 CPC ....... F16H 2037/048; F16H 2200/0078; F16H 2200/0095; F16H 2200/2007
 See application file for complete search history.

(56) References Cited

FOREIGN PATENT DOCUMENTS

| | | |
|---|---|---|
| DE | 10 2014 018 947 A1 | 7/2015 |
| DE | 10 2017 005 310 A1 | 12/2018 |
| DE | 10 2017 007 763 A1 | 2/2019 |
| EP | 3 165 791 A1 | 5/2017 |
| JP | 2007-138978 A | 6/2007 |
| RU | 2 652 485 C1 | 4/2018 |
| WO | WO 2016/053171 A1 | 4/2016 |

\* cited by examiner

| | S6a | | | KS1a | | | | S1a | | | S2a | | KS2a | | |
|---|---|---|---|---|---|---|---|---|---|---|---|---|---|---|---|
| | S6La | S6Na | S6Ra | KS1Na | KS1MLa | KS1MRa | KS1Ra | S1La | S1Na | S1Ra | S2La | S2Na | KS2La | KS2Na | KS2Ra |
| V1a | ● | | | ● | | | | | ● | | ● | ● | ● | | |
| V2a | ● | | | ● | | | | ● | | | ● | ● | ● | | |
| V3a | | ● | | ● | | | | | | ● | ● | ● | ● | | |
| V4a | | ● | | ● | | | | ● | | | ● | ● | ● | | |
| V5a | ● | | | ● | | | | | ● | | ● | ● | ● | | |
| V6a | | ● | | ● | | | | | ● | | ● | | ● | | |
| V7a | ● | | | ● | | | | | ● | | ● | | | ● | |
| V8a | | ● | | ● | | | | ● | | | ● | | | ● | |
| V9a | | ● | | ● | | | | | ● | | ● | | | | ● |
| V10a | | ● | | ● | | | | ● | | | | ● | | | ● |
| V11a | ● | | | ● | | | | | ● | | | ● | | | ● |
| V12a | | | ● | ● | | | | | ● | | | ● | | | ● |
| R1a | ● | | | | | ● | | | ● | | ● | ● | ● | | |
| R2a | | ● | | | ● | | | | ● | | ● | ● | ● | | |
| R3a | ● | | | | | ● | | | ● | | ● | ● | | | ● |
| R4a | | ● | | | ● | | | | ● | | ● | | | | ● |

Fig. 2

GROUP TRANSMISSION DEVICE, IN PARTICULAR SPLIT TRANSMISSION

BACKGROUND AND SUMMARY OF THE INVENTION

The invention relates to a group transmission device, in particular a split transmission.

Document DE 10 2017 007 763 A1 already describes a group transmission device with an upshift assembly which is of planetary design and which comprises a first transmission element, a second transmission element and a third transmission element, with a downshift assembly which is of planetary design and which comprises a first transmission element, a second transmission element and a third transmission element, with a main shaft arranged coaxially to the upshift assembly, with a layshaft arranged parallel to the main shaft, with a first shift unit and with a first idler gear arranged coaxially to the main shaft and axially between the upshift assembly and the downshift assembly, which first idler gear is connectable for conjoint rotation to the main shaft by means of the first shift unit.

The invention is based on the object of providing an advantageously variably shiftable group transmission device with a compact design.

The invention is based on a group transmission device, in particular a split transmission, having an upshift assembly which is of planetary design and which comprises a first transmission element, a second transmission element and a third transmission element, having a downshift assembly which is of planetary design and which comprises a first transmission element, a second transmission element and a third transmission element, with a main shaft arranged coaxially to the upshift assembly, with a layshaft arranged parallel to the main shaft, with a first shift unit and with a first idler gear arranged coaxially to the main shaft and axially between the upshift assembly and the downshift assembly, which first idler gear is connectable for conjoint rotation to the main shaft by means of the first shift unit.

It is proposed that the group transmission device has a second shift unit which is intended to connect the first idler gear for conjoint rotation to the third transmission element of the downshift assembly. The design of the group transmission device according to the invention makes it possible to provide, in particular, an advantageously variably shiftable group transmission device with a compact design. The design according to the invention can advantageously enable double power-branched gears, in which a torque can be branched into two power paths in the upshift assembly and can be combined again in the downshift assembly. A spur gear pairing can be used for power-branched operation, in which, on the one hand, power or torque is introduced into the downshift assembly via the layshaft and, in particular simultaneously, power is introduced into the downshift assembly via the main shaft. Furthermore, the spur gear pairing can advantageously also be used in a non-power-split operation, in which power only flows via one of the two power paths. The design according to the invention can advantageously provide twelve well-graded forward gears that can be shifted, in particular by means of at least one dog clutch, and four reverse gears, wherein the forward gears and reverse gears can be selected by means of five actuators, for example five shift forks. Thus, an advantageously low number of circuit elements can be achieved. Due to the embodiment according to the invention, the first idler gear can advantageously be used for a conventional gear in a state decoupled from the main shaft. By connecting the third transmission element of the downshift assembly to a gearwheel of the layshaft, a gear change from a highest gear to a lowest gear without tractive force interruption is advantageously made possible. Preferably, the group transmission device completely forms a group transmission. Particularly preferably, the group transmission device has a spread of at least 15. Preferably, the group transmission device has a main group. Preferably, the main group is intended for shifting a plurality of gears. The term "intended" shall be understood to mean specifically designed and/or equipped. The concept of an object being intended for a specific function shall be understood to mean that the object fulfils and/or performs this specific function in at least one application and/or operating state. Advantageously, the main group has at least one reduction gearing, particularly preferably at least two reduction gearings. The group transmission device is intended for use in a motor vehicle, in particular a truck. Preferably, the motor vehicle comprises the group transmission device. Preferably, the group transmission device is configured as a split transmission, in particular a power split transmission, for splitting a drive torque by means of at least two power paths to the main shaft and to the layshaft, wherein the layshaft is coupled or can be coupled again to the main shaft at one end of the layshaft. Preferably, one of the power paths has shiftable gears, wherein the power path with the shiftable gears has means for reducing or increasing the torque transmitted via this power path. Preferably, at least one shiftable gear and/or its power path can be made free of torque via the means, while the other power path continues to transmit torque. This can enable gear shifting without torque interruption. Particularly preferably, the group transmission device is designed to be power-shiftable.

The term "coupled" should be understood to mean coupled, or coupled for conjoint rotation, or advantageously permanently coupled for conjoint rotation via at least one transmission, advantageously via at least one shaft and/or at least one toothing. The term "coupled" is to be understood advantageously to mean coupled or coupled for conjoint rotation, particularly advantageously permanently coupled for conjoint rotation via at most one transmission, particularly advantageously via at most one shaft and/or at most one toothing.

A "shift unit" is to be understood to be a unit with at least two coupling elements and at least one shift element which is intended to establish a shiftable connection between the at least two coupling elements.

A "shift element" of a shift unit is to be understood to be an element which is preferably designed to be axially displaceable and which, in at least one operating state, in particular in at least one shift position of the shift unit, is intended for coupling the at least two coupling elements for conjoint rotation.

A "coupling element" is to be understood to be an element of the shift unit which is permanently connected for conjoint rotation to a transmission element, such as a gear shaft, an idler gear, a fixed gear and/or an axle, which is preferably axially and radially fixed and which is intended for a frictional, force-locking and/or interlocking connection to the shift element, such as an idler gear which has toothing for connection to the shift element.

A "planetary design" is to be understood as a design of an assembly, in particular a transmission assembly, in which at least one planetary gear is contained in the assembly. A "planetary gear" is intended to mean a unit with at least one planetary gear set, preferably with exactly one planetary gear set.

A "planetary gear set" is to be understood to be a unit of a planetary gearing with a sun gear, with a ring gear, with a planet carrier and with a plurality of planet gears, wherein the planet gears are arranged by the planet carrier on a circular path around the sun gear. Preferably, the upshift assembly is formed by a planetary gearing. Preferably, the first transmission element of the upshift assembly is configured as a sun gear. Preferably, the second transmission element of the upshift assembly is configured as a planet carrier. Preferably, the third transmission element of the upshift assembly is configured as a ring gear. Preferably, the upshift assembly has at least two fourth transmission elements. Preferably, the at least two fourth transmission elements of the upshift assembly are each configured as a planetary gear. Preferably, the downshift assembly is formed by a planetary gearing. Preferably, the first transmission element of the downshift assembly is configured as a sun gear. Preferably, the second transmission element of the downshift assembly is configured as a planet carrier. Preferably, the third transmission element of the downshift assembly is configured as a ring gear. Preferably, the downshift assembly has at least two fourth transmission elements. Preferably, the at least two fourth transmission elements of the downshift assembly are each configured as a planetary gear. Preferably, the layshaft is arranged at a distance from the main shaft.

A "spur gear pairing" is to be understood to be a pairing of two spur gears that are permanently meshed with each other.

A "connection of two rotatably mounted elements for conjoint rotation" shall be understood to mean that the two elements are arranged coaxially to each other and are connected in such a way that they rotate with the same angular velocity.

In this context, the terms "axially" and "radially" refer to a main axis of rotation of the group transmission device, in particular the main shaft, so that the term "axially" denotes a direction that is parallel or coaxial to the main axis of rotation. Furthermore, the term "radially" refers to a direction that is perpendicular to the main axis of rotation.

Furthermore, it is proposed that the group transmission device has a first fixed gear arranged on the layshaft and connected for conjoint rotation to the layshaft, wherein the first idler gear is arranged in a permanently meshing manner with the first fixed gear in order to form a first gear plane. This design enables an advantageous transmission of a speed which can be transmitted to the downshift transmission. Preferably, the first idler gear is arranged in the first gear plane. The term "gear plane" is intended to mean a gear plane which is intended for a transmission ratio or a reduction of a rotational speed. The term "permanently meshing" it is to be understood such that the gears of a pairing of two spur gears are permanently meshed with each other. Preferably, only fixed gears and no idler gears are arranged on the layshaft. This makes it possible to provide an advantageously simple layshaft without shift units. Furthermore, oiling of the layshaft can be advantageously omitted, wherein no oil guides or deep-hole boring are required, whereby manufacturing costs can be advantageously kept low. Furthermore, it is advantageous that the layshaft can be positioned freely without having to consider the positioning of shift units.

It is further proposed that the group transmission device has an input shaft, a second fixed gear and a third shift unit, wherein the third shift unit is intended for connecting the third transmission element of the upshift assembly to the main shaft for conjoint rotation, wherein the second transmission element of the upshift assembly is permanently connected for conjoint rotation to the input shaft and the first transmission element of the upshift assembly is connected for conjoint rotation to an upshift assembly fixed gear of the upshift assembly, wherein the upshift assembly fixed gear is connected in a permanently meshing manner to the second fixed gear. By means of this embodiment, an advantageously variably shiftable group transmission device can be provided. Preferably, the input shaft is intended to be coupled to at least one drive unit, in particular an internal combustion engine and/or an electric motor. Preferably, the third shift unit is configured as a partial shift unit. A "partial shift unit" is to be understood to be a shift unit that is part of a combi shift unit consisting of a plurality of combined shift units.

Furthermore, it is proposed that the upshift assembly has exactly one simple planetary gear set, which comprises the first transmission element, the second transmission element and the third transmission element of the upshift assembly. This design makes it possible to achieve an advantageously compact axial design. Furthermore, an advantageously simple upshift assembly can thus be achieved.

Furthermore, it is proposed that the downshift assembly has exactly one simple planetary gear set, which comprises the first transmission element, the second transmission element and the third transmission element of the downshift assembly. This design makes it possible to achieve an advantageously compact axial design. Furthermore, an advantageously simple downshift assembly can thereby be achieved. Furthermore, an advantageously low-cost production can be achieved, since a further planetary gear set of the downshift assembly can be advantageously omitted.

It is also proposed that the group transmission device has a second idler gear arranged coaxially to the main shaft and a third idler gear arranged coaxially to the main shaft, wherein exactly three gear planes are arranged axially between the upshift assembly and the rear shift assembly, namely the first gear plane, a second gear plane in which the second idler gear is arranged, and a third gear plane in which the third idler gear is arranged. This design enables an advantageously low number of gear planes, in particular by means of a combined power split. As a result, an advantageously low number of shift units is required, whereby an advantageously simple group transmission device can be provided. Furthermore, an advantageously compact axial design can be made possible. Advantageously, all idler gears and thus also all shift units are arranged coaxially to the main shaft, whereby an advantageously simple and cost-effective production can be achieved.

In addition, it is proposed that the group transmission device has a further layshaft and a reverse gearwheel which is arranged on the further layshaft, is connected for conjoint rotation to the further layshaft and is arranged in the third gear plane. By this design, an advantageously conventional design for at least one reverse gear can be achieved. By this design, a load on the group transmission device in a reverse gear can be kept advantageously low. Preferably, the further layshaft is arranged parallel to the main shaft. Preferably, the further layshaft is arranged at a distance from the main shaft. Preferably, the further layshaft is arranged parallel to the layshaft. Preferably, the further layshaft is arranged at a distance from the layshaft. The reverse gearwheel is intended to provide at least one reverse gear of the group transmission device.

Furthermore, it is proposed that the group transmission device has a fourth shift unit, which is intended to connect the third transmission element of the upshift assembly to the main shaft for conjoint rotation and at the same time to the third idler gear for conjoint rotation. This design makes it possible to provide an advantageously variably shiftable group transmission device. Preferably, the fourth shift unit is configured as a partial shift unit. Preferably, the main shaft extends up to the fourth shift unit.

It is further proposed that the group transmission device has a fifth shift unit which is intended to connect the third idler gear to the main shaft for conjoint rotation. This design makes it possible to provide a group transmission device that can be advantageously variably shiftable. Preferably, the fifth shift unit is configured as a partial shift unit.

It is also proposed that the third shift unit, the fourth shift unit and the fifth shift unit are combined to form a combi shift unit, which is arranged axially between the upshift assembly and the third gear plane. This design makes it possible to provide an advantageously versatile combi shift unit by means of which at least three shift states can be set. This design also enables an advantageously compact design. Preferably, the third shift unit, the fourth shift unit and the fifth shift unit are arranged spatially directly one after the other. In particular, there are no further transmission elements between the third shift unit, the fourth shift unit and the fifth shift unit. A "combi shift unit" is intended to mean a shift unit that comprises a plurality of partial shift units. The term "combine" is to be understood to mean that a plurality of partial shift units together form exactly one shift unit with a plurality of shifting functions. Preferably, the combi shift unit has at least one shift element. Preferably, the combi shift unit has exactly one shift element. The at least one shift element is designed in particular as a sliding sleeve or as a claw. Preferably, the combi shift element comprises four shift states. In particular, the combi shift unit is formed by a shift unit with at least three coupling elements. The term "shift unit with at least three coupling elements" is to be understood to mean a shift unit in which the shift element is intended for shiftably connecting a coupling element, in particular an inner coupling element, to at least one of the other coupling elements in each case or for decoupling it therefrom. By combining them as a combi shift unit, the shift positions, in particular of the third shift unit, the fourth shift unit and the fifth shift unit, are in particular dependent on one another.

Furthermore, it is proposed that the group transmission device has a blocking shift unit, which is intended for blocking the planetary gear set of the downshift assembly, and a braking shift unit, which is intended for connecting the third transmission element of the downshift assembly to a housing for conjoint rotation. By means of this embodiment, an advantageously variably shiftable group transmission device can be provided. Furthermore, the first idler gear can be advantageously released by the blocking shift unit in the main group and can thus continue to be available for the formation of the transmission ratio. Preferably, the blocking shift unit is intended to connect the second transmission element of the downshift assembly to the third transmission element of the downshift assembly for conjoint rotation. The term "connected to a housing for conjoint rotation" is to be understood to mean a connection in which an element cannot be rotated relative to the housing. Particularly preferably, the blocking shift unit and the braking shift unit are combined to form a further combi shift unit.

It is also proposed that the group transmission device has a torque adjustment unit which can be coupled to the third transmission element of the upshift assembly via a first shiftable modulator gear plane in such a way that at least one torque can be introduced into the upshift assembly via the third transmission element of the upshift assembly starting from the torque adjustment unit. This design allows an advantageously energy-efficient group transmission device to be provided. Furthermore, an advantageously power-shiftable group transmission device can thus be provided. A "torque adjustment unit" is to be understood to be a unit which is intended for changing a transmitted torque in at least one operating state. Preferably, the torque adjustment unit is intended for reducing and/or increasing a transmitted torque. Preferably, the torque adjustment unit is intended for a change, in particular for a stepless change, of a transmission ratio of the group transmission device in a start-up process and/or in a shifting process. Preferably, the torque adjustment unit is intended in at least one operating state for reducing and/or increasing a transmitted torque, advantageously in order to get at least one shiftable idler gear free of a torque. Particularly preferably, the torque adjustment unit has a braking element. Preferably, the braking element is configured as an electric machine, a hydraulic pump, a retarder or a friction brake. Preferably, when the braking element is configured as an electric machine, the electric machine can be operated as a generator to apply braking.

Further advantages result from the following description of the figures. The figures show two exemplary embodiments of the invention. The figures, the figure description and the claims contain numerous features in combination. A person skilled in the art will expediently also consider the features individually and combine them to form further useful combinations.

BRIEF DESCRIPTION OF THE DRAWINGS

FIG. 2 is a circuit diagram of the group transmission device according to the invention in the first exemplary embodiment in table form.

DETAILED DESCRIPTION OF THE DRAWINGS

Figure 1:
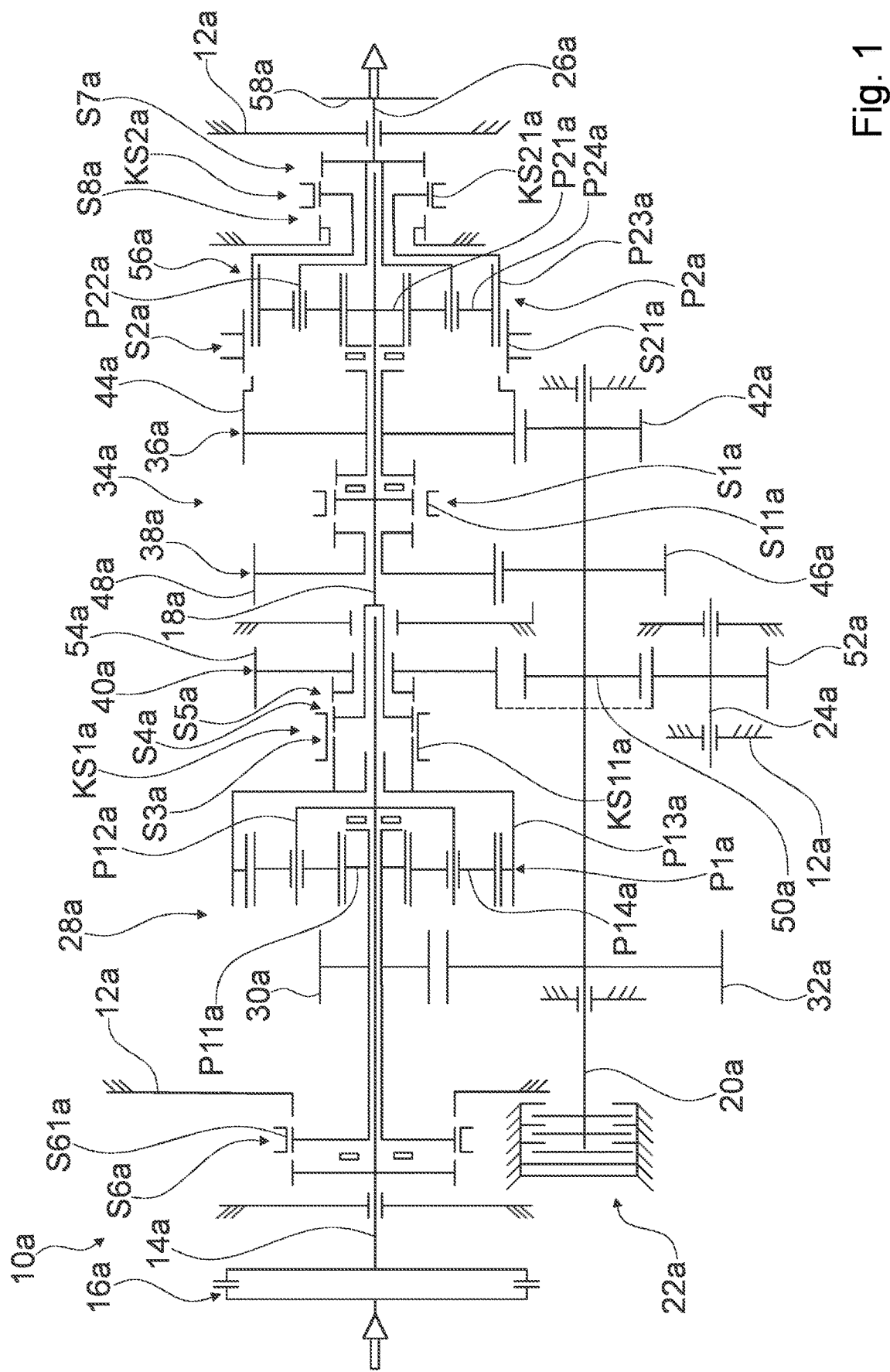
FIG. 1 shows a motor vehicle group transmission device according to the invention in a first exemplary embodiment in a schematic representation.

FIG. 1 shows a group transmission device 10a in a first exemplary embodiment. The group transmission device 10a is intended for use in a motor vehicle, in particular a truck, which is not shown in greater detail. The motor vehicle comprises the group transmission device 10a. The group transmission device 10a completely forms a group transmission. The group transmission device 10a is configured as a split transmission. The group transmission device 10a is formed by a power split transmission. The group transmission device 10a is designed to be power-shiftable. The group transmission device 10a has a spread of at least 15. As a result, it can advantageously be started without an electric motor and/or a retarder by means of at least one drive unit. The group transmission device 10a has a housing 12a, which is only shown in places for reasons of clarity.

The group transmission device 10a has an input shaft 14a. The input shaft 14a is rotatably mounted relative to the housing 12a. The input shaft 14a is intended to be coupled to the at least one drive unit, not shown in more detail, in particular an internal combustion engine and/or an electric motor. The group transmission device 10a has a disconnect clutch 16a intended for coupling the input shaft 14a to the at least one drive unit for conjoint rotation. The disconnect clutch 16a is configured as a friction clutch.

The group transmission device 10a has a main shaft 18a. The main shaft 18a is rotatably mounted relative to the housing 12a. The group transmission device 10a has a layshaft 20a. The layshaft 20a is rotatably mounted relative to the housing 12a. The layshaft 20a is arranged parallel to the input shaft 14a. The layshaft 20a is arranged at a distance from the input shaft 14a. The layshaft 20a is arranged parallel to the main shaft 18a. The layshaft 20a is arranged at a distance from the main shaft 18a. No idler gear is arranged on the layshaft 20a. The group transmission device 10a has a layshaft brake 22a. The layshaft brake 22a is intended for braking the layshaft 20a for synchronisation. The group transmission device 10a has a further layshaft 24a. The further layshaft 24a is arranged parallel to the main shaft 18a. The further layshaft 24a is arranged at a distance from the main shaft 18a. The further layshaft 24a is arranged parallel to the layshaft 20a. The further layshaft 24a is arranged at a distance from the layshaft 20a. In a split gear design, the group transmission device 10a is intended for splitting a drive torque by means of two power paths to the main shaft 18a and to the layshaft 20a, wherein the layshaft 20a can be coupled to the main shaft 18a again at one end of the layshaft 20a. One of the power paths has shiftable gears, wherein the power path with the shiftable gears in particular has means for reducing or increasing the torque transmitted via this power path. Preferably, at least one shiftable gear and/or its power path can be made free of torque via the means, while the other power path continues to transmit torque. The group transmission device 10a has an output shaft 26a. The output shaft 26a is rotatably mounted with respect to the housing 12a. The output shaft 26a is arranged coaxially to the input shaft 14a.

The group transmission device 10a has a upshift assembly 28a which is of planetary design and which comprises a first transmission element P11a, a second transmission element P12a and a third transmission element P13a. The second transmission element P12a of the upshift assembly 28a is permanently connected for conjoint rotation to the input shaft 14a. The main shaft 18a is arranged coaxially to the upshift assembly 28a. The upshift assembly 28a is formed by a planetary gear. The upshift assembly 28a has exactly one simple planetary gear set P1a, which comprises the first transmission element P11a, the second transmission element P12a and the third transmission element P13a of the upshift assembly 28a. The first transmission element P11a of the upshift assembly 28a is configured as a sun gear. The second transmission element P12a of the upshift assembly 28a is configured as a planet carrier. The third transmission element P13a of the upshift assembly 28a is configured as a ring gear. The upshift assembly 28a comprises at least two fourth transmission elements P14a. The at least two fourth transmission elements P14a of the upshift assembly 28a are each configured as a planetary gear. The planetary gear set P1 of the upshift assembly 28a comprises the at least two fourth transmission elements P14a of the upshift assembly 28a.

The upshift assembly 28a has an upshift assembly fixed gear 30a. The upshift assembly fixed gear 30a is separate from the planetary gear set P1 of the upshift assembly 28a. The upshift assembly fixed gear 30a is arranged coaxially to the input shaft 14a. The first transmission element P11a of the upshift assembly 28a is permanently fixed for conjoint rotation to the upshift assembly fixed gear 30a of the upshift assembly 28a. The group transmission device 10a has a second fixed gear 32a. The second fixed gear 32a is arranged on the layshaft 20a. The second fixed gear 32a is connected for conjoint rotation to the layshaft 20a. The second fixed gear 32a is arranged coaxially to the layshaft 20a. The fixed gear 30a is permanently connected to the second fixed gear 32a in a meshing manner.

The group transmission device 10a has a main group 34a. The main group 34a is intended for shifting a plurality of gears. The group transmission device 10a comprises exactly three gear planes 36a, 38a, 40a, namely a first gear plane 36a, a second gear plane 38a and a third gear plane 40a. The exactly three gear planes 36a, 38a, 40a are arranged in the main group 34a.

The group transmission device 10a has a first fixed gear 42a. The first fixed gear 42a is arranged on the layshaft 20a. The first fixed gear 42a is connected for conjoint rotation to the layshaft 20a. The first fixed gear 42a is arranged in the first gear plane 36a. The group transmission device 10a has a first idler gear 44a. The first idler gear 44a is arranged in the first gear plane 36a. The first idler gear 44a is arranged coaxially to the main shaft 18a. The first idler gear 44a is permanently meshed with the first fixed gear 42a to form the first gear plane 36a. The first idler gear 44a and the first fixed gear 42a form a first spur gear pairing of the main group 34a.

The group transmission device 10a has a third fixed gear 46a. The third fixed gear 46a is arranged on the layshaft 20a. The third fixed gear 46a is connected for conjoint rotation to the layshaft 20a. The third fixed gear 46a is arranged in the second gear plane 38a. The group transmission device 10a has a second idler gear 48a. The second idler gear 48a is arranged in the second gear plane 38a. The second idler gear 48a is arranged coaxially to the main shaft 18a. The third fixed gear 46a is permanently meshed with the second idler gear 48a to form the second gear plane 38a. The second idler gear 48a and the third fixed gear 46a form a second spur gear pairing of the main group 34a.

The group transmission device 10a has a fourth fixed gear 50a. The fourth fixed gear 50a is arranged on the layshaft 20a. The fourth fixed gear 50a is connected for conjoint rotation to the layshaft 20a. The fourth fixed gear 50a is arranged in the third gear plane 40a. The group transmission device 10a has a reverse gear 52a arranged on the further layshaft 24a and connected for conjoint rotation to the further layshaft 24a. The reverse gear 52a is arranged in the third gear plane 40a. The reverse gearwheel 52a is arranged coaxially to the further layshaft 24a. The reverse gearwheel 52a is intended to provide at least one reverse gear of the group transmission device 10a. The fourth fixed gear 50a is permanently meshed with the reverse gear 52a. The group transmission device 10a has a third idler gear 54a. The third idler gear 54a is arranged in the third gear plane 40a. The third idler gear 54a is arranged coaxially to the main shaft 18a. The reverse gear 52a is permanently meshed with the third idler gear 54a.

The group transmission device 10a has a downshift assembly 56a which is of planetary design and which comprises a first transmission element P21a, a second transmission element P22a and a third transmission element P23a. The first transmission element P21a of the downshift assembly 56a is permanently connected for conjoint rotation to the main shaft 18a. The main shaft 18a is arranged coaxially to the downshift assembly 56a. The second transmission element P22a of the downshift assembly 56a is permanently connected for conjoint rotation to the output shaft 26a. The downshift assembly 56a is configured as a range group, in particular a lower and an upper group. The downshift assembly 56a is formed by a planetary gearing. The downshift assembly 56a has exactly one simple planetary gear set P2a, which comprises the first transmission element P21a, the second transmission element P22a and the third transmission element P23a of the downshift assembly 56a. The first transmission element P21a of the downshift assembly 56a is configured as a sun gear. The second transmission element P22a of the downshift assembly 56a is configured as a planet carrier. The third transmission element P23a of the downshift assembly 56a is configured as a ring gear. The downshift assembly 56a comprises at least two fourth transmission elements P24a. The at least two fourth transmission elements P24a of the downshift assembly 56a are each configured as a planetary gear. The planetary gear set P2a of the downshift assembly 56a comprises the at least two fourth transmission elements P24a of the downshift assembly 56a. The exactly three gear planes 36a, 38a, 40a are axially arranged between the upshift assembly 28a and the downshift assembly 56a. The first idler gear 44a is arranged axially between the upshift assembly 28a and the downshift assembly 56a. The second idler gear 48a is arranged axially between the upshift assembly 28a and the downshift assembly 56a. The third idler gear 54a is arranged axially between the upshift assembly 28a and the downshift assembly 56a. The reverse gearwheel 52a is arranged axially between the upshift assembly 28a and the downshift assembly 56a.

The group transmission device 10a has an output gear 58a. The output gear 58a is permanently connected for conjoint rotation to the output shaft 26a. The output gear 58a is coupled, for example, to an axle drive not shown further.

The group transmission device 10a has a first shift unit S1a. The first shift unit S1a has a shift element S11a. The shift element S11a of the first shift unit S1a is configured as a sliding sleeve. The first idler gear 44a is connectable to the main shaft 18a for conjoint rotation by means of the first shift unit S1a. The second idler gear 48a can be connected for conjoint rotation to the main shaft 18a by means of the first shift unit S1a. The first shift unit S1a has a first shift position S1La, a second shift position S1Na and a third shift position S1Ra. In the first shift position S1La of the first shift unit S1a, the first idler gear 44a is coupled for conjoint rotation to the main shaft 18a. In the first shift position S1La of the first shift unit S1a, the second idler gear 48a is decoupled from the main shaft 18a. FIG. 1 shows the second shift position S1Na of the first shift unit S1a. The second shift position S1Na of the first shift unit S1a is configured as a neutral position. In the second shift position S1Na of the first shift unit S1a, the first idler gear 44a and the second idler gear 48a are decoupled from the main shaft 18a. In the third shift position S1Ra of the first shift unit S1a, the second idler gear 48a is coupled for conjoint rotation to the main shaft 18a. In the third shift position S1Ra of the first shift unit S1a, the first idler gear 44a is decoupled from the main shaft 18a.

The group transmission device 10a has a second shift unit S2a. The second shift unit S2a has a shift element S21a. The shift element S21a of the second shift unit S2a is configured as a claw. The second shift unit S2a is intended for connecting the first idler gear 44a to the third transmission element P23a of the downshift assembly 56a for conjoint rotation. The second shift unit S2a has a first shift position S2La and a second shift position S2Na. FIG. 1 shows the first shift position S2La of the second shift unit S2a. In the first shift position S2La of the second shift unit S2a, the third transmission element P23a of the downshift assembly 56a is coupled for conjoint rotation to the first idler gear 44a. The second shift position S2Na of the second shift unit S2a is configured as a neutral position. In the second shift position S2Na of the second shift unit S2a, the third transmission element P23a of the downshift assembly 56a is decoupled from the first idler gear 44a.

The group transmission device 10a has a third shift unit S3a. The third shift unit S3a is configured as a partial shift unit. The third shift unit S3a is intended for connecting the third transmission element P13a of the upshift assembly 28a to the main shaft 18a for conjoint rotation. The group transmission device 10a has a fourth shift unit S4a. The fourth shift unit S4a is intended for connecting the third transmission element P13a of the upshift assembly 28a to the main shaft 18a for conjoint rotation and, at the same time, to the third idler gear 54a for conjoint rotation. The fourth shift unit S4a is configured as a partial shift unit. The main shaft 18a extends to the fourth shift unit S4a. The group transmission device 10a has a fifth shift unit S5a. The fifth shift unit S5a is intended for connecting the third idler gear 54a to the main shaft 18a for conjoint rotation. The fifth shift unit S5a is configured as a partial shift unit. The group transmission device 10a has a combi shift unit KS1a. The third shift unit S3a, the fourth shift unit S4a and the fifth shift unit S5a are combined to form the combi shift unit KS1a. The third shift unit S3a, the fourth shift unit S4a and the fifth shift unit S5a are spatially arranged directly one after the other. There are no further transmission elements between the third shift unit S3a, the fourth shift unit S4a and the fifth shift unit S5a. The combi shift unit KS1a is arranged axially between the upshift assembly 28a and the third gear plane 40a. The combi shift unit KS1a has exactly one shift element KS11a. The shift element KS11a of the combi shift unit KS1a is configured as a sliding sleeve. The combi shift element KS1a comprises a first shift position KS1Na, a second shift position KS1MLa, a third shift position KS1MRa and a fourth shift position KS1Ra. The first shift position KS1Na of the combi shift unit KS1a is configured as a neutral position. In the first shift position KS1Na of the combi shift unit KS1a, the third transmission element P13a of the upshift assembly 28a is decoupled from the main shaft 18a. In the first shift position KS1Na of the combi shift unit KS1a, the third transmission element P13a of the upshift assembly 28a is decoupled from the third idler gear 54a. In the first shift position KS1Na of the combi shift unit KS1a, the third idler gear 54a is decoupled from the main shaft 18a. FIG. 1 shows the second shift position KS1MLa of the combi shift unit KS1a. In the second shift position KS1MLa of the combi shift unit KS1a, the third transmission element P13a of the upshift assembly 28a is coupled to the main shaft 18a for conjoint rotation. In the second shift position KS1MLa of the combi shift unit KS1a, the third transmission element P13a of the upshift assembly 28a is decoupled from the third idler gear 54a. In the second shift position KS1MLa of the combi shift unit KS1a, the third idler gear 54a is decoupled from the main shaft 18a. The second shift position KS1MLa of the combi shift unit KS1a is assigned to the third shift unit S3a. In the third shift position KS1MRa of the combi shift unit KS1a, the third transmission element P13a of the upshift assembly 28a is coupled for conjoint rotation to the main shaft 18a and simultaneously for conjoint rotation to the third idler gear 54a. In the third shift position KS1MRa of the combi shift unit KS1a, the third idler gear 54a is coupled to the main shaft 18a for conjoint rotation. The third shift position KS1MRa of the combi shift unit KS1a is assigned to the fourth shift unit S4a. By means of the third shift position KS1MRa of the combi shift unit KS1a, a power split reverse gear can be provided. In the fourth shift position KS1Ra of the combi shift unit KS1a, the third transmission element P13a of the upshift assembly 28a is decoupled from the main shaft 18a. In the fourth shift position KS1Ra of the combi shift unit KS1a, the third transmission element P13a of the upshift assembly 28a is decoupled from the third idler gear 54a. In the fourth shift position KS1Ra of the combi shift unit KS1a, the third idler gear 54a is coupled to the main shaft 18a for conjoint rotation. The fourth shift position KS1Ra of the combi shift unit KS1a is assigned to the fifth shift unit S5a. By means of the fourth shift position KS1Ra of the combi shift unit KS1a, a reverse gear is formed solely via the layshaft 20a. Due to the combination as a combi shift unit KS1a, the shift positions of the third shift unit S3a, the fourth shift unit S4a and the fifth shift unit S5a are dependent on each other.

The group transmission device 10a has a sixth shift unit S6a. The sixth shift unit S6a has a shift element S61a. The shift element S61a of the sixth shift unit S6a is configured as a sliding sleeve. The sixth shift unit S6a is intended for connecting the input shaft 14a for conjoint rotation to the first transmission element P11a of the upshift assembly 28a. The sixth shift unit S6a is intended for connecting the input shaft 14a to the upshift assembly fixed gear 30a for conjoint rotation. The sixth shift unit S6a is intended for connecting the first transmission element P11a of the upshift assembly 28a to the housing 12a for conjoint rotation. The sixth shift unit S6a has a first shift position S6La, a second shift position S6Na and a third shift position S6Ra. In the first shift position S6La of the sixth shift unit S6a, the input shaft 14a is coupled for conjoint rotation to the first transmission element P11a of the upshift assembly 28a. In the first shift position S6La of the sixth shift unit S6a, the input shaft 14a is coupled for conjoint rotation to the upshift assembly fixed gear 30a. FIG. 1 shows the second shift position S6Na of the sixth shift unit S6a. The second shift position S6Na of the sixth shift unit S6a is configured as a neutral position. In the second shift position S6Na of the sixth shift unit S6a, the input shaft 14a is decoupled from the first transmission element P11a of the upshift assembly 28a. In the second shift position S6Na of the sixth shift unit S6a, the input shaft 14a is decoupled from the upshift assembly fixed gear 30a. In the third shift position S6Ra of the sixth shift unit S6a, the first transmission element P11a of the upshift assembly 28a is coupled for conjoint rotation to the housing 12a. In the third shift position S6Ra of the sixth shift unit S6a, the upshift assembly fixed gear 30a is coupled to the housing 12a for conjoint rotation. In the third shift position S6Ra of the sixth shift unit S6a, the first transmission element P11a of the upshift assembly 28a is decoupled from the input shaft 14a. In the third shift position S6Ra of the sixth shift unit S6a, the upshift assembly fixed gear 30a is decoupled from the input shaft 14a.

The group transmission device 10a has a blocking shift unit S7a. The blocking shift unit S7a is configured as a partial shift unit. The blocking shift unit S7a is intended for blocking the planetary gear set P2 of the downshift assembly 56a. The blocking shift unit S7a is intended for connecting the second transmission element P22a of the downshift assembly 56a to the third transmission element P23a of the downshift assembly 56a for conjoint rotation. The group transmission device 10a has a braking shift unit S8a. The braking shift unit S8a is configured as a partial shift unit. The braking shift unit S8a is intended for connecting the third transmission element P23a of the downshift assembly 56a to the housing 12a for conjoint rotation. The group transmission device 10a has a further combi shift unit KS2a. The blocking shift unit S7a and the braking shift unit S8a are combined to form the further combi shift unit KS2a. The blocking shift unit S7a and the braking shift unit S8a are arranged spatially directly one after the other. There are no further transmission elements between the blocking shift unit and the braking shift unit. The further combi shift unit KS2a has exactly one shift element KS21a. The shift element KS21a of the further combi shift unit KS2a is configured as a sliding sleeve. The further combi shift element KS2a comprises a first shift position KS2La, a second shift position KS2Na and a third shift position KS2Ra. In the first shift position KS2La of the further combi shift unit KS2a, the third transmission element P23a of the downshift assembly 56a is coupled to the housing 12a for conjoint rotation. In the first shift position KS2La of the further combi shift unit KS2a, the third transmission element P23a of the downshift assembly 56a is decoupled from the second transmission element P22a of the downshift assembly 56a. The first shift position KS2La of the further combi shift unit KS2a is assigned to the braking shift unit S8a. FIG. 1 shows the second shift position KS2Na of the further combi shift unit KS2a. The second shift position KS2Na of the further combi shift unit KS2a is configured as a neutral position. In the second shift position KS2Na of the further combi shift unit KS2a, the third transmission element P23a of the downshift assembly 56a is decoupled from the housing 12a. In the second shift position KS2Na of the further combi shift unit KS2a, the second transmission element P22a of the downshift assembly 56a is decoupled from the third transmission element P23a of the downshift assembly 56a. In the third shift position KS2Ra of the further combi shift unit KS2a, the third transmission element P23a of the downshift assembly 56a is coupled to the second transmission element P22a of the downshift assembly 56a for conjoint rotation. In the third shift position KS2Ra of the further combi shift unit KS2a, the third transmission element P23a of the downshift assembly 56a is decoupled from the housing 12a. The third shift position KS2Ra of the further combi shift unit KS2a is assigned to the blocking shift unit S7a. Due to the combination as a further combi shift unit KS2a, the shift positions of the blocking shift unit S7a and the braking shift unit S8a are dependent on each other.

FIG. 2 shows a schematic diagram of the group transmission device 10a. The group transmission device 10a has twelve forward gears V1a, V2a, V3a, V4a, V5a, V6a, V7a, V8a, V9a, V10a, V11a, V12a. The group transmission device 10a has four reverse gears R1a, R2a, R3a, R4a. The shift diagram shows how, by means of an adjustment of the shift states S1La, S1Na, S1Ra, S2La, S2Na, S6La, S6Na, S6Ra, KS1Na, KS1MLa, KS1MRa, KS1Ra, KS2La, KS2Na, KS2Ra the forward gears V1a, V2a, V3a, V4a, V5a, V6a, V7a, V8a, V9a, V10a, V11a, V12a and the reverse gears R1a, R2a, R3a, R4a are shiftable.

By means of the group transmission device 10a, a spread extension is advantageously achieved by additional conventional gears including a power upshift. By setting the fourth shift position KS1Ra of the combi shift unit KS1a and the first shift position S6La of the sixth shift unit S6a, a total torque is transmitted to the layshaft 20a. Setting the first shift position S1La or the third shift position S1Ra of the first shift unit S1a thus results in two gears in a lower group and in an upper group of the downshift assembly 56a, respectively. Since a load on a toothing of the layshaft 20a increases, these gears are only used as starting gears in the lower group of the downshift assembly 56a in order to advantageously minimise a damage component due to the low driving component. A start-up process for these gears is carried out via the disconnect clutch 16a. A shift from a first forward gear V1a to a second forward gear V2a is effected with a frictional interruption. The layshaft brake 22a can assist with this. A third forward gear V3a operates in a power split. The third forward gear V3a can be engaged directly via the disconnect clutch 16a. A fourth forward gear V4a operates in a power split. The fourth forward gear V4a can be started directly via the separating clutch 16a.

By means of the group transmission device 10a, a number of gear planes is advantageously reduced by a combined power split. By changing from the fastest gear in the lower group to the slowest gear in the upper group via the power split group 56a, the step jump between these gears is advantageously defined. This results in five gears within the ranges with a predetermined step jump of approximately 30%. The planetary gear set P1a of the upshift assembly 28a runs here from the slowest gear to the fastest gear. During a shift via the downshift assembly 56a when the first shift position S2La of the second shift unit S2a is set, the planetary gear set P2a of the downshift assembly 56a is shifted from the fastest gear to the slowest gear. In this case, a shifting operation is only carried out by actuating the shift element KS21a of the further combi shift unit KS2a. In the process, the main group 34a passes through all intermediate gears. If the step jump between a range change is doubled, one gear can advantageously be dispensed with for the same step jump. To control the gears, it is only necessary to set the second shift position KS2Na of the further combi shift unit KS2a. The intermediate gears are then shifted in the main group 34a.

The first forward gear V1a is configured as a direct gear. The second forward gear V2a is configured as a direct gear. The third forward gear V3a is configured as a power split gear. The fourth forward gear V4a is configured as a power split gear on a first power path. A fifth forward gear V5a is configured as a direct gear. A sixth forward gear V6a is configured as an overdrive gear. A seventh forward gear V7a is configured as a direct gear. An eighth forward gear V8a is configured as a power split gear on a second power path. A ninth forward gear V9a is configured as a power split gear on the first power path. A tenth forward gear V10a is configured as a power split gear on the second power path. An eleventh forward gear V11a is configured as a direct gear. A twelfth forward gear V12a is configured as an overdrive gear.

With an intermediate group of the downshift assembly 56a between the lower group and the upper group of the downshift assembly 56a, two new gears are thereby advantageously available by means of a reduction of a gear plane. Advantageously, this reduces a maximum speed of the first transmission element P11a of the layshaft 28a and thus a power component via the layshaft 20a. Advantageously, this increases a service life of the group transmission device 10a and advantageously reduces a torque reduction at an output during a shifting process. With a dual use of the first gear plane 36a, it is additionally possible to use a power split gear and a conventional gear also in the lower group of the downshift assembly 56a. With this measure, a 12-speed transmission with more than twice the spread and thus starting capability in the motor vehicle, in particular a long-distance motor vehicle, can advantageously be provided from a 9-speed transmission without a modulator.

By means of the third gear plane 40a, a load on the group transmission device 10a can be advantageously reduced. This results in two conventional reverse gears in the lower group and in the upper group of the downshift assembly 56a. A step change of the reverse gears R1a, R2a, R3a, R4a is formed via the downshift assembly 56a. By combining a reverse gear shift and an exemption of the third transmission element P13a of the upshift assembly 28a, one shift element can be advantageously saved. In the first shift position KS1Na of the combi shift unit KS1a, a conventional gear can be engaged. The first shift position KS1Na of the combi shift unit KS1a is required for the two starting gears and the conventional reverse gear. In the second shift position KS1MLa of the combi shift unit KS1a, power split forward gears are active. In the third shift position KS1MRa of the combi shift unit KS1a, a power split reverse gear is active. In the fourth shift position KS1Ra of the combi shift unit KS1a, a power split reverse gear is active. This means that the combi shift unit KS1a can be operated by means of an existing gear selector, in particular a newAMT. This can advantageously reduce development costs. The shift element KS21a of the further combi shift unit KS2a is controlled by a floating piston with spring centring without separate valves or by means of existing sensors.

Figure 3:
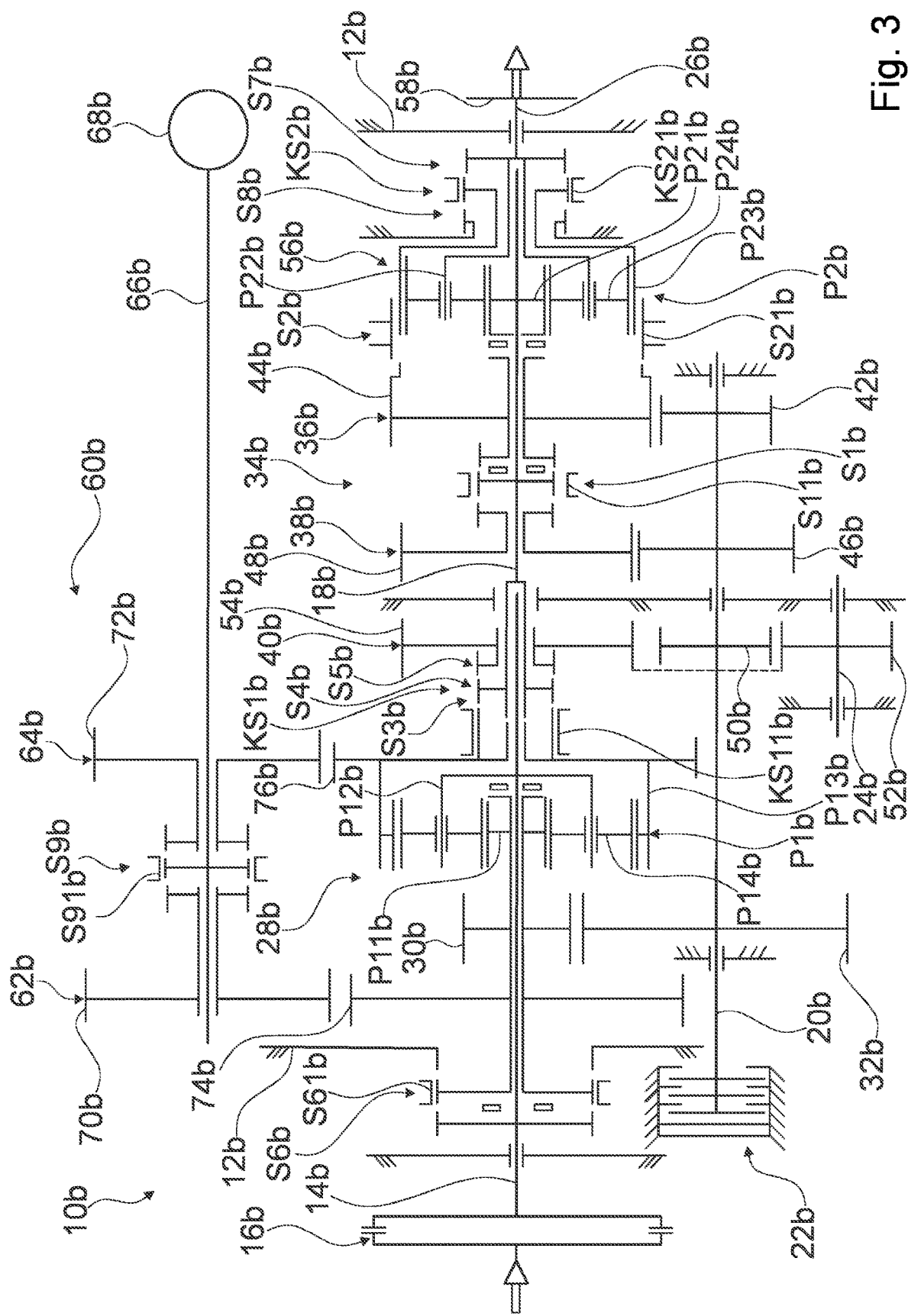
FIG. 3 shows a motor vehicle group transmission device according to the invention in a second exemplary embodiment in a schematic representation.

FIG. 3 shows a second exemplary embodiment of the invention. The following descriptions and the drawings are fundamentally limited to the differences between the exemplary embodiments, wherein reference can in principle also be made to the drawings and/or the description of the other exemplary embodiments, in particular of FIGS. 1 and 2, with regard to components with the same name, in particular with regard to components with the same reference numerals. To distinguish the exemplary embodiments, the letter a is placed after the reference numerals of the first exemplary embodiment in FIGS. 1 and 2. In the second exemplary embodiment in FIG. 3, the letter a is replaced by the letter b.

FIG. 3 shows a group transmission device 10b in a second exemplary embodiment. The group transmission device 10b has a housing 12b, which is only shown in places for reasons of clarity. The group transmission device 10b has a disconnect clutch 16b. The group transmission device 10b has an input shaft 14b. The group transmission device 10b has a main shaft 18b. The group transmission device 10b has a layshaft 20b. The group transmission device 10b has a layshaft brake 22b. The group transmission device 10b has a further layshaft 24b. The group transmission device 10b has an output shaft 26b. The group transmission device 10b has an upshift assembly 28b which is of planetary design and which comprises a first transmission element P11b, a second transmission element P12b and a third transmission element P13b. The upshift assembly 28b has exactly one simple planetary gear set P1b, which comprises the first transmission element P11b, the second transmission element P12b and the third transmission element P13b of the upshift assembly 28b. The group transmission device 10b has a main group 34b. The group transmission device 10b comprises exactly three gear planes 36b, 38b, 40b, namely a first gear plane 36b, a second gear plane 38b and a third gear plane 40b. The group transmission device 10b has a downshift assembly 56b which is of planetary design and which comprises a first transmission element P21b, a second transmission element P22b and a third transmission element P23b. The downshift assembly 56b has exactly one simple planetary gear set P2b, which comprises the first transmission element P21b, the second transmission element P22b and the third transmission element P23b of the downshift assembly 56b. The upshift assembly 28b has an upshift assembly fixed gear 30b. The group transmission device 10b has a first fixed gear 42b. The group transmission device 10b has a second fixed gear 32b. The group transmission device 10b has a third fixed gear 46b. The group transmission device 10b has a fourth fixed gear 50b. The group transmission device 10b has a reverse gear 52b. The group transmission device 10b has a first idler gear 44b. The group transmission device 10b has a second idler gear 48b. The group transmission device 10b has a third idler gear 54b. The group transmission device 10b has an output gear 58b. The group transmission device 10b has a first shift unit S1b. The first shift unit S1b has a shift element S11b. The first shift unit S1b has a first shift position, a second shift position and a third shift position. The shift positions of the first shift unit S1b correspond to the shift positions S1La, S1Na, S1Ra of the first shift unit Sla of the first exemplary embodiment. The group transmission device 10b has a second shift unit S2b. The second shift unit S2b has a shift element S21b. The second shift unit S2b has a first shift position and a second shift position. The shift positions of the second shift unit S2b correspond to the shift positions S2La, S2Na of the second shift unit S2a of the first exemplary embodiment. The group transmission device 10b has a third shift unit S3b. The group transmission device 10b has a fourth shift unit S4b. The group transmission device 10b has a fifth shift unit S5b. The group transmission device 10b has a combi shift unit KS1b. The third shift unit S3b, the fourth shift unit S4b and the fifth shift unit S5b are combined to form the combi shift unit KS1b. The combi shift unit KS1b has a shift element KS11b. The combi shift element KS1b comprises a first shift position, a second shift position, a third shift position and a fourth shift position. The shift positions of the combi shift element KS1b correspond to the shift positions of the combi shift element KS1a of the first exemplary embodiment. The group transmission device 10b has a sixth shift unit S6b. The sixth shift unit S6b has a shift element S61b. The sixth shift unit S6b has a first shift position, a second shift position and a third shift position. The shift positions of the sixth shift unit S6b correspond to the shift positions S6La, S6Na, S6Ra of the sixth shift unit S6a of the first exemplary embodiment. The group transmission device 10b has a blocking shift unit S7b. The group transmission device 10b has a braking shift unit S8b. The group transmission device 10b has another combi shift unit KS2b. The blocking shift unit S7b and the braking shift unit S8b are combined to form the further combi shift unit KS2b. The further combi shift unit KS2b has a shift element KS21b. The further combi shift element KS2b comprises a first shift position, a second shift position and a third shift position. The shift positions of the further combi shift unit KS2b correspond to the shift positions KS2La, KS2Na, KS2Ra of the further combi shift unit KS2a of the first exemplary embodiment.

In contrast to the group transmission device 10a described in the description of FIGS. 1 and 2, the group transmission device 10b additionally has a torque adjustment unit 60b. The torque adjustment unit 60b has a first shiftable modulator gear plane 62b and a second shiftable modulator gear plane 64b. The torque adjustment unit 60b has a modulator shaft 66b. The modulator shaft 66b is arranged in parallel with the input shaft 14b. The modulator shaft 66b is arranged at a distance from the input shaft 14b. The torque adjustment unit 60b comprises a braking element 68b. The braking element 68b is configured as an electric machine, as a hydraulic pump, a retarder or a friction brake. An element of the braking element 68b, for example a rotor of the electric machine, is particularly preferably permanently connected for conjoint rotation to the modulator shaft 66b. The torque adjustment unit 60b has a first modulator idler gear 70b and a second modulator idler gear 72b. The first modulator idler gear 70b is arranged in the first modulator gear plane 62b. The first modulator idler gear 70b is arranged coaxially to the modulator shaft 66b. The second modulator idler gear 72b is arranged in the second modulator gear plane 64b. The second modulator idler gear 72b is arranged coaxially to the modulator shaft 66b. The upshift assembly 28b has a further upshift assembly fixed gear 74b. The further upshift assembly fixed gear 74b is permanently connected for conjoint rotation to the third transmission element P13b of the upshift assembly 28b. The further upshift assembly fixed gear 74b is arranged coaxially to the input shaft 14b. The further upshift assembly fixed gear 74b is arranged in the first modulator gear plane 62b. The first modulator idler gear 70b is permanently meshed with the further upshift assembly fixed gear 74b. The third transmission element P13b of the upshift assembly 28b has an outer toothing 76b. The outer toothing 76b is oriented coaxially to the input shaft 14b. The outer toothing 76b is arranged in the second modulator gear plane 64b. The second modulator gear 72b is permanently meshed with the outer toothing 76b.

The torque adjustment unit 60b has a modulator shift unit S9b. The modulator shift unit S9b has a shift element S91b. The shift element S91b of the modulator shift unit S9b is configured as a sliding sleeve. The modulator shift unit 60b has a first shift position, a second shift position and a third shift position. In the first shift position of the modulator shift unit S9b, the first modulator idler gear 70b is coupled for conjoint rotation to the modulator shaft 66b. In the first shift position of the modulator shift unit S9b, the second modulator idler gear 72b is decoupled from the modulator shaft 66b. FIG. 3 shows the second shift position. The second shift position of the modulator shift unit S9b is configured as a neutral position. In the second shift position of the modulator shift unit S9b, the first modulator idler gear 70b and the second modulator idler gear 72b are decoupled from the modulator shaft 66b. In the third shift position of the modulator shift unit S9b, the second modulator idler gear 72b is coupled for conjoint rotation to the modulator shaft 66b. In the second shift position of the modulator shift unit S9b, the first modulator idler gear 70b is decoupled from the modulator shaft 66b.

The torque adjustment unit 60b can be coupled to the third transmission element P13b of the upshift assembly 28b via the first shiftable modulator gear plane 62b, in such a way that at least one torque can be introduced into the upshift assembly 28b via the third transmission element P13b of the upshift assembly 28b starting from the torque adjustment unit 60b. The torque adjustment unit 60b, in a start-up process and/or in a shift process, is intended for a stepless change of a transmission ratio of the group transmission device 10b. In at least one operating state, the torque adjustment unit 60b is intended for reducing and/or increasing a transmitted torque, advantageously in order to obtain at least one shiftable idler gear free of a torque.

By means of the brake element 68b, a partial power shift from a first forward gear corresponding to the forward gear V1a of the first exemplary embodiment into a third forward gear corresponding to the forward gear V3a of the first exemplary embodiment, or from a second forward gear corresponding to the second forward gear V2a of the first exemplary embodiment into a fourth forward gear corresponding to the fourth forward gear V4a of the first exemplary embodiment, is possible. In this case, the third transmission element P13b of the upshift assembly 28b is braked via the second modulator gear plane 64b. The shift element S61b of the sixth shift unit S6b is thereby relieved and torque-free. Subsequently, the second shift position of the sixth shift unit S6b can be set, wherein a speed of the third transmission element P13b of the upshift assembly 28b can be adapted to a target speed of the main shaft 18b. If the speed difference is small, the second shift position of the combi shift unit KS1b is adjusted. With a braking element 68b configured as an electric machine, a drive can also take place at the first modulator gear plane 62*b* and thus can relieve at least one drive unit, which is not shown in more detail, until a torque-free condition is reached. The drive provided is then completely electric. Also in this state, the second shift position of the sixth shift unit S6*b* can be set and then the combi shift unit KS1*b* can be shifted. If the braking element 68*b* is configured as an electric machine, the electric machine can advantageously be operated as a generator for a braking action.

LIST OF REFERENCE CHARACTERS 10 group transmission device
12 housing
14 input shaft
16 disconnect clutch
18 main shaft
20 layshaft
22 layshaft brake
24 layshaft
26 output shaft
28 upshift assembly
30 upshift assembly fixed gear
32 fixed gear
34 main group
36 gear plane
38 gear plane
40 gear plane
42 fixed gear
44 idler gear
46 fixed gear
48 idler gear
50 fixed gear
52 reverse gear
54 idler gear
56 downshift assembly
58 output gear
60 torque adjustment unit
62 modulator gear plane
64 modulator gear plane
66 modulator shaft
68 brake element
70 modulator idler gear
72 modulator idler gear
74 upshift assembly fixed gear
76 outer toothing
KS1 combi shift unit
KS11 shift element
KS1N shift position
KS1ML shift position
KS1MR shift position
KS1R shift position
KS2 combi shift unit
KS21 shift element
KS2L shift position
KS2N shift position
KS2R shift position
P1 planetary gear set
P11 transmission element
P12 transmission element
P13 transmission element
P14 transmission element
P2 planetary gear set
P21 transmission element
P22 transmission element
P23 transmission element
P24 transmission element
R1 reverse gear
R2 reverse gear
R3 reverse gear
R4 reverse gear
S1 shift unit
S11 shift element
S1L shift position
S1N shift position
S1R shift position
S2 shift unit
S21 shift element
S2L shift position
S2N shift position
S3 shift unit
S4 shift unit
S5 shift unit
S6 shift unit
S61 shift element
S6L shift position
S6N shift position
S6R shift position
S7 blocking shift unit
S8 braking shift unit
S9 modulator shift unit
S91 shift element
V1 forward gear
V2 forward gear
V3 forward gear
V4 forward gear
V5 forward gear
V6 forward gear
V7 forward gear
V8 forward gear
V9 forward gear
V10 forward gear
V11 forward gear
V12 forward gear

The invention claimed is:

1. A group transmission device (10*a*), comprising:
an upshift assembly (28*a*; 28*b*) which is of planetary design and which comprises a first transmission element (P11*a*; P11*b*), a second transmission element (P12*a*; P12*b*) and a third transmission element (P13*a*; P13*b*);
a downshift assembly (56*a*; 56*b*) which is of planetary design and which comprises a first transmission element (P21*a*; P21*b*), a second transmission element (P22*a*; P22*b*) and a third transmission element (P23*a*; P23*b*);
a main shaft (18*a*; 18*b*) arranged coaxially to the upshift assembly (28*a*; 28*b*);
a layshaft (20*a*; 20*b*) arranged parallel to the main shaft (18*a*; 18*b*);
a first shift unit (S1*a*; S1*b*);
a first idler gear (44*a*; 44*b*) which is arranged coaxially to the main shaft (18*a*; 18*b*) and axially between the upshift assembly (28*a*; 28*b*) and the downshift assembly (56*a*; 56*b*) and which is connectable to the main shaft (18*a*; 18*b*) for conjoint rotation by the first shift unit (S1*a*; S1*b*); and
a second shift unit (S2*a*; S2*b*), wherein the first idler gear (44*a*; 44*b*) is connectable to the third transmission element (P23*a*; P23*b*) of the downshift assembly (56*a*; 56*b*) for conjoint rotation by the second shift unit (S2*a*; S2*b*).

2. The group transmission device according to claim 1, further comprising a first fixed gear (42*a*; 42*b*) arranged on the layshaft (20a; 20b) and connected for conjoint rotation to the layshaft (20a; 20b), wherein the first idler gear (44a; 44b) is arranged in a permanently meshing manner with the first fixed gear (42a; 42b) to form a first gear plane (36a; 36b).

3. The group transmission device according to claim 2, further comprising:
an input shaft (14a; 14b);
a second fixed gear (32a; 32b) arranged on the layshaft (20a; 20b) and connected for conjoint rotation to the layshaft (20a; 20b); and
a third shift unit (S3a; S3b), wherein the third transmission element (P13a; P13b) of the upshift assembly (28a; 28b) is connectable to the main shaft (18a; 18b); 18b) for conjoint rotation by the third shift unit (S3a; S3b);
wherein the second transmission element (P12a; P12b) of the upshift assembly (28a; 28b) is permanently connected for conjoint rotation to the input shaft (14a; 14b);
wherein the first transmission element (P11a; P11b) of the upshift assembly (28a; 28b) is connected for conjoint rotation to an upshift assembly fixed gear (30a; 30b) of the upshift assembly (28a; 28b) and wherein the upshift assembly fixed gear (30a; 30b) is connected in a permanently meshing manner to the second fixed gear (32a; 32b).

4. The group transmission device according to claim 1, wherein the upshift assembly (28a; 28b) has exactly one simple planetary gear set (P1a; P1b) which comprises the first transmission element (P11a; P11b), the second transmission element (P12a; P12b) and the third transmission element (P13a; P13b) of the upshift assembly (28a; 28b).

5. The group transmission device according to claim 2, further comprising:
a second idler gear (48a; 48b) arranged coaxially to the main shaft (18a; 18b); and
a third idler gear (54a; 54b) arranged coaxially to the main shaft (18a; 18b);
wherein exactly three gear planes (36a, 38a, 40a, 40b, 40b) are arranged axially between the upshift assembly (28a; 28b) and the downshift assembly (56a; 56b) and wherein the exactly three gear planes (36a, 38a, 40a, 40b, 40b) comprise the first gear plane (36a; 36b), a second gear plane (38a; 38b) in which the second idler gear (48a; 48b) is arranged, and a third gear plane (40a; 40b) in which the third idler gear (54a; 54b) is arranged.

6. The group transmission device according to claim 5, further comprising a further layshaft (24a; 24b) and a reverse gearwheel (52a; 52b) which is arranged on the further layshaft (24a; 24b) and is connected for conjoint rotation to the further layshaft (24a; 24b) and is arranged in the third gear plane (40a; 40b).

7. The group transmission device according to claim 5, further comprising:
a third shift unit (S3a; S3b), wherein the third transmission element (P13a; P13b) of the upshift assembly (28a; 28b) is connectable to the main shaft (18a; 18b); 18b) for conjoint rotation by the third shift unit (S3a; S3b); and
a fourth shift unit (S4a; S4b) for connecting the third transmission element (P13a; P13b) of the upshift assembly (28a; 28b) to the main shaft (18a; 18b) for conjoint rotation simultaneously to the third idler gear (54a; 54b) for conjoint rotation.

8. The group transmission device according to claim 7, further comprising a fifth shift unit (S5a; S5b) for connecting the third idler gear (54a; 54b) to the main shaft (18a; 18b) for conjoint rotation.

9. The group transmission device according to claim 8, wherein the third shift unit (S3a; S3b), the fourth shift unit (S4a; S4b) and the fifth shift unit (S5a; S5b) are combined to form a combi shift unit (KS1a; KS1b) which is arranged axially between the upshift assembly (28a; 28b) and the third gear plane (40a; 40b).

10. The group transmission device according to claim 1, wherein the downshift assembly (56a; 56b) comprises exactly one simple planetary gear set (P2a; P2b) which comprises the first transmission element (P21a; P21b), the second transmission element (P22a; P22b) and the third transmission element (P23a; P23b) of the downshift assembly (56a; 56b).

11. The group transmission device according to claim 10, further comprising:
a blocking shift unit (S7a; S7b) for blocking the planetary gear set (P2a; P2b) of the downshift assembly (56a; 56b); and
a braking shift unit (S8a; S8b) for connecting the third transmission element (P23a; P23b) of the downshift assembly (56a; 56b) to a housing (12a; 12b) for conjoint rotation.

12. The group transmission device according to claim 1, further comprising a torque adjustment unit (60b) which is coupleable to the third transmission element (P13b) of the upshift assembly (28b) via a first shiftable modulator gear plane (62b) such that at least one torque is introducible into the upshift assembly (28b) starting from the torque adjustment unit (60b) via the third transmission element (P13b) of the upshift assembly (28b).

* * * * *